United States Patent [19]

Allen

[11] Patent Number: 5,116,256
[45] Date of Patent: May 26, 1992

[54] KENNEL RUN ISOLATING MEANS

[75] Inventor: James F. Allen, Wilmington, Ohio

[73] Assignee: The Mason Company, Leesburg, Ohio

[21] Appl. No.: 621,274

[22] Filed: Nov. 30, 1990

[51] Int. Cl.⁵ .................................................. A01K 1/02
[52] U.S. Cl. ........................................ 119/17; 52/241; 119/19; 119/27
[58] Field of Search ..................... 119/17, 19, 20, 27; 52/241; 256/24, 31, 73

[56] References Cited

U.S. PATENT DOCUMENTS

| | | | |
|---|---|---|---|
| Re. 31,556 | 4/1984 | Buchanan | 119/19 |
| 1,947,698 | 2/1934 | Corbin, Jr. | 119/19 |
| 2,013,693 | 9/1935 | McInerney | 52/241 |
| 2,105,588 | 1/1938 | Davis | 52/241 |
| 2,241,704 | 5/1941 | Goldsmith | 52/241 |
| 3,087,458 | 4/1963 | Bennett, Jr. | 119/17 |
| 3,160,280 | 12/1964 | Burch | 52/241 |
| 3,258,251 | 6/1966 | Culter | 256/24 X |
| 3,828,733 | 8/1974 | Correia | 119/27 X |
| 3,919,976 | 11/1975 | Meyer et al. | 119/16 |
| 3,951,106 | 4/1976 | Wright | 119/19 |
| 3,983,670 | 10/1976 | Lightfoot | 52/241 X |
| 4,599,972 | 7/1986 | Kilburn | 119/27 |
| 4,696,259 | 9/1987 | Fewox | 119/20 X |
| 4,794,879 | 1/1989 | Thom et al. | 119/17 |

Primary Examiner—Gene Mancene
Assistant Examiner—Thomas Price
Attorney, Agent, or Firm—Wood, Herron & Evans

[57] ABSTRACT

Structure for isolating a kennel run from wash water and other waste from an adjacent run. An upwardly opening channel is sealed to the floor between the runs, and a partition is supported directly above this channel with its lower edge essentially in the channel, so that waste cannot pass above or below the channel, and so that the waste runs from the partition into the channel.

12 Claims, 1 Drawing Sheet

KENNEL RUN ISOLATING MEANS

This invention relates to animal kennels or cages, and more particularly to a means for isolating one run of a kennel from wash water and waste contamination from an adjacent run, and for facilitating cleanout.

BACKGROUND

In facilities having multiple kennel runs (cages), side-by-side individual runs are separated from one another by a partition or fence such as chainlink fencing. The runs usually have a common floor; materials such as animal waste, rain, or wash water in one run can flow on the floor under the fence or partition into the adjacent run and possibly contaminate that run and spread disease among the animals. It is therefore generally desirable that each run be "isolated" from the run or runs adjacent to it so that wash water, liquid waste, fecal matter and the like in one run cannot flow into an adjacent run.

THE PRIOR ART

The provision of a floor drainage trough in a kennel is known, see for example Corbin Patent No. 1,947,698, in which the trough is centered and provides no isolation. Buchanan patent Re. No. 31,556 recognizes the desirability of isolating waste in separate runs, and provides isolating walls and a series of gutters which are cast or formed in a masonry floor between the runs, for removing the waste. Thom patent No. 4,794,879 discloses side-by-side kennel runs which are separated by a partition wall over a drain channel cast longitudinally in a concrete floor. The channel is covered by a T-shaped baffle, beneath the partition wall. The cost of such installations is relatively great because the drainage channels are set in the floor.

There has been a need for a means of isolating kennels which does not require masonry walls or an in-floor gutter between runs, and which can be inexpensively retrofitted to existing kennels.

BRIEF DESCRIPTION

In accordance with this invention, adjacent kennel runs are "isolated" from one another so that liquid or solids cannot pass through or flow under the partition between them. This is accomplished by the provision of an upwardly opening channel which is set on and sealed to the floor between the adjacent runs, directly below a partition or wall between the runs. At least the lower part of the partition is an imperforate panel such as a sheet of metal or plastic, which is aligned with the channel. The panel is supported so that its lower edge is substantially within the channel, between the channel sidewalls. Together, the panel and the channel block flow from one run into the other. In the preferred embodiment the panel has a bottom frame member or stiffener along its lower edge, in the form of a pipe which is secured longitudinally below the panel. The bottom frame member helps prevent bending, warping, or bowing of the panel which would disalign it from the channel. The bottom frame member and panel are supported and positioned to drain into the channel, preferably by transverse hangers which extend across the channel. The hangers position and partially support the frame member which in turn supports the panel directly above it, the frame member and panel thereby being centered with respect to the channel so that any waste on the panel drains downwardly past the stiffener into the upwardly opening channel below it. The channel and floor may slope downwardly to a drain or other outlet, so that waste in each run is removed while remaining isolated from other runs.

DESCRIPTION OF THE DRAWINGS

The invention can best be further described by reference to the accompanying drawings in which.

DETAILED DESCRIPTION

Figure 1:
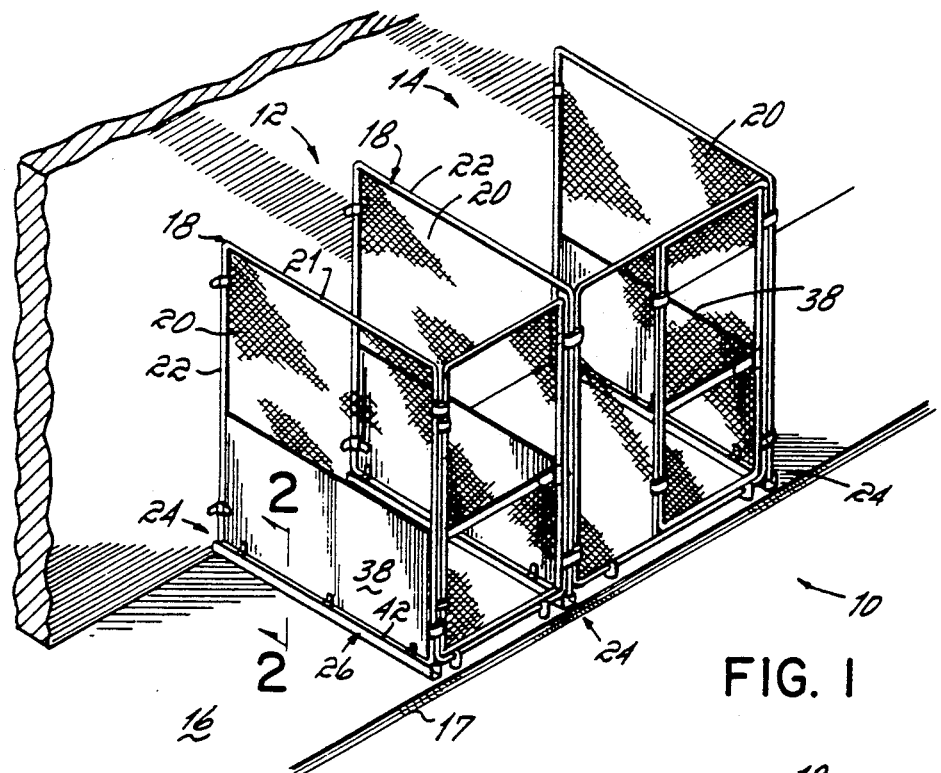
FIG. 1 is a perspective view, partly broken away, of one type of kennel having side-by-side runs in which the invention is installed.

In FIG. 1, a kennel 10 has at least two adjacent runs or cages 12, 14 on a common floor 16. The floor, which may be of concrete, usually slopes gradually downward toward one or the other end of the run (the outer or right end, in the illustrated example), to a gutter 17. The two runs 12, 14 are separated by a partition or divider 18 between them. Typically partition 18 may be a section of chainlink fence 20 attached to a rectangular frame 21 around its periphery. In the absence of the invention, if a dog should urinate on or near the partition it will run through the fence or below its lower edge, into the adjacent run; similarly, wash water from hosing out the runs can flow from one run into another. This can lead to the spread of disease and is undesirable.

Isolation means 24 in accordance with this invention are provided between adjacent runs 12, 14, and along their outer sides, as shown in FIG. 1. Each isolation means comprises a channel 26, preferably U-shaped and having upstanding sidewalls 28, 30 and a bottom 32 between them. The bottom 32 of the channel is sealed to the surface of floor 16 by a sealant 34 which preferably engages a series of longitudinal grooves 36 in the lower side of the channel bottom 32. A silicone sealant, for example Dow Corning "737", is preferred. The channel is centered directly under partition 18. At least the lower part of the fencing 20 is preferably replaced (or, less preferably, overlaid) by a solid (imperforate) panel 38 which may be of galvanized steel, stainless steel, ABS plastic, or the like and to provide a barrier.

Figure 2:
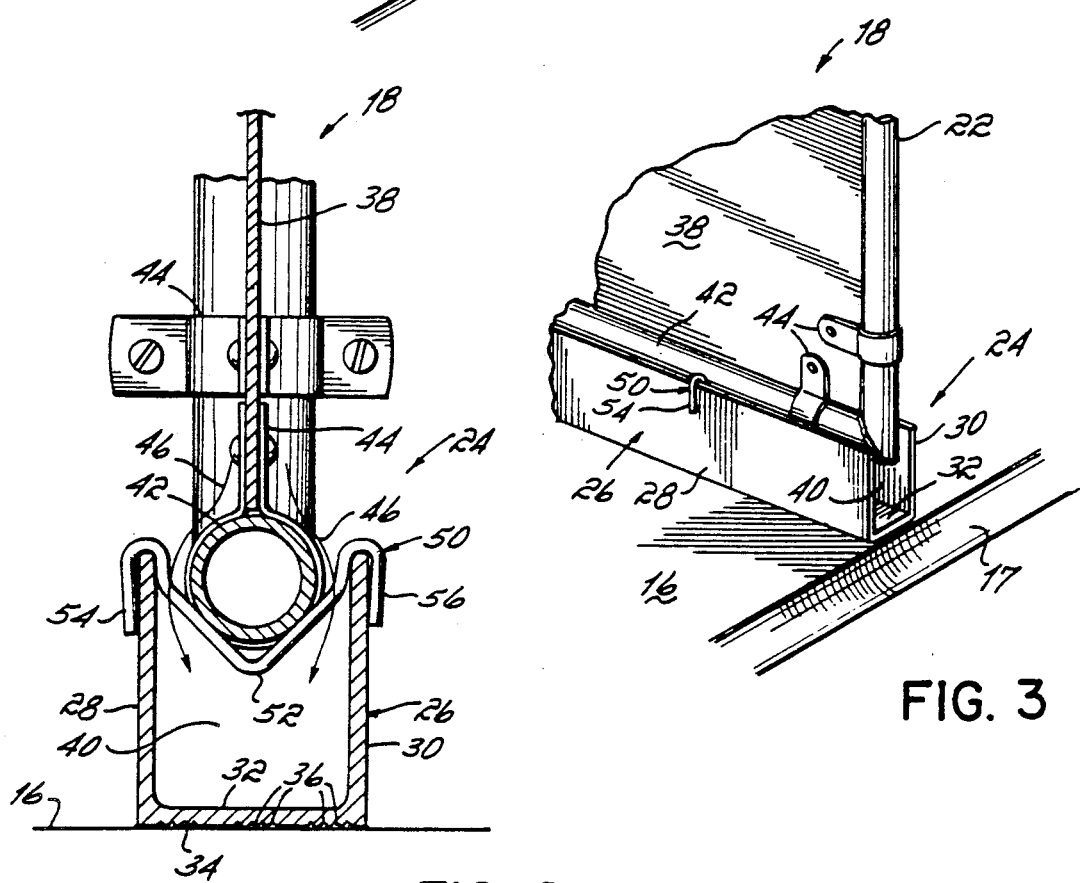
FIG. 2 is an enlarged vertical section taken on line 2—2 of FIG. 1.
Figure 3:
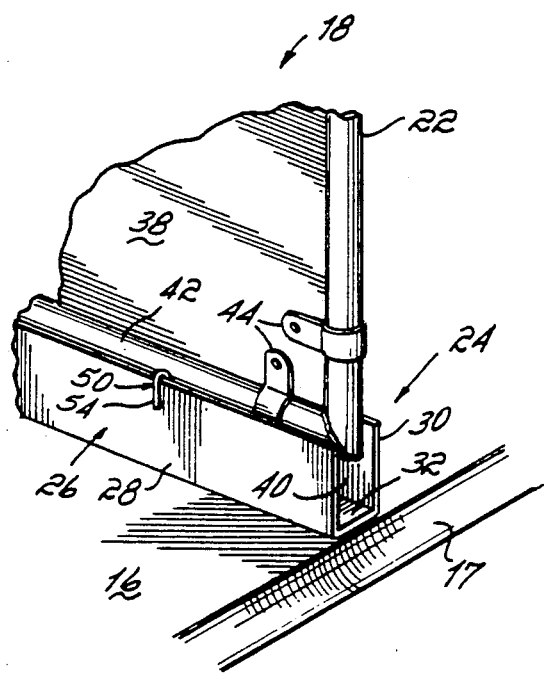
FIG. 3 is an enlarged perspective view of the end portion of the isolating means.

Panel 38 is centered with respect to the sidewalls 28, 30 of channel 26, so that any waste impinging on either side of the panel will drain down and into the region 40 between the channel sidewalls (see FIG. 2). A frame member or pipe 42, preferably 1 ⅛ outside diameter galvanized pipe, is mounted along the lower edge of the panel. The pipe stiffens panel 38 and prevents it from bending if, for example, a dog should jump or lean against it, and maintains the panel centered in or over channel 26. Pipe 42 is connected to the panel as by keyhole clips 44 which are spot-welded in place. The pipe has a diameter substantially less (for example, about ⅛ less) than the dimension between the top edges of the channel walls 28, 30 so as to permit drainage into the side-walls, as indicated by the arrows 46 in FIG. 2. At its ends, pipe 42 is mitered and joined, as by welding, to a vertical frame member 22 which may be of similar size and material (see FIG. 3). The joint between the horizontal (bottom) and vertical frame members 42 and 22 of frame 21 should be welded closed to prevent liquid from entering the joint and causing corrosion.

The welded corner is preferably recoated with zinc paint.

The lower edge of pipe 42 is maintained centered with respect to the channel and is supported by transverse hangers 50 which extend across the channel from one sidewall to the other. Preferably each hanger has a drop or sunken center portion in the form of a "V" 52, in which pipe 42 rests (see FIG. 2). Hangers 50 are preferably made of wire rod and have downturned outer ends 54, 56 which hang down outside of the channel sidewalls, thereby centering the drop center 52 in channel space 40 and preventing the hangers from being dislodged if panel is pushed sideways. Alternatively panel 38 could rest on the bottom 32 of the channel for support, or could be suspended at its ends or from the top; but the hangers shown are preferred because they permit air to circulate through the channel, from one run to the next.

It can be seen that the invention can easily be incorporated or retrofitted into an existing kennel, by replacing the lower part of fencing 20 with an isolation panel 38 and attaching it to the bottom frame member 22. Channel 26 is positioned on the floor and sealed in place, hangers 50 are set in place in the channel, and the stiffener is centered in the hangers. Each run is thereby effectively and efficiently isolated from liquid or solid waste or run off in the other.

Having described the invention, what is claimed is:

1. A kennel run isolating device comprising,
   adjacent kennel runs situated on a common floor and having a common partition between them,
   said partition, at least in its lower portion, comprising an imperforate panel which prevents liquid waste from an animal in one of said runs from passing through the panel into an adjacent run,
   an upwardly opening channel mounted on said floor directly beneath said panel,
   means sealing said channel to said floor to prevent the passage of liquid beneath said channel from one of said runs into another of said runs,
   said channel having a bottom and sidewalls on each side of said bottom, said channel sloping longitudinally to an outlet,
   said panel having a lower edge positioned substantially between the sidewalls of said channel, and
   means supporting said panel in such position whereby waste impinging on said panel from either side thereof will flow downwardly off said panel into said channel, and along said channel to said outlet.

2. The kennel run isolating device of claim 1 wherein the lower edge of said panel comprises a frame member, said frame member resting on said supporting means between the sidewalls of said channel.

3. The kennel run isolating device of claim 2 wherein said frame member is a pipe narrower than said channel.

4. The kennel run isolating device of claim 3 wherein said panel is connected to said pipe by keyhole clips.

5. The kennel run isolating device of claim 1 wherein said channel is U-shaped in section.

6. The kennel run isolating device of claim 1 wherein said panel is a metal sheet.

7. The kennel run isolating device of claim 1 wherein said supporting means positions the lower edge of said panel with respect to said channel.

8. A kennel run isolating device comprising,
   adjacent kennel runs situated on a common floor and having a common partition between them,
   said partition, at least in its lower portion, comprising an imperforate panel,
   an upwardly opening channel mounted on said floor directly beneath said panel,
   means sealing said channel to said floor to prevent the passage of liquid beneath said channel from one of said runs into another of said runs,
   said channel having a bottom and sidewalls on each side of said bottom, said channel sloping longitudinally to an outlet,
   means supporting said panel in such position whereby waste impinging on said panel will flow downwardly off said panel into said channel, and along said channel to said outlet,
   said supporting means comprising a plurality of transverse supports extending across said channel from one sidewall to the other sidewall thereof,
   said panel having a lower edge which is positioned by said transverse supports substantially between said sidewalls of said channel.

9. The kennel run isolating device of claim 8 wherein said transverse supports rest on upper edges of said sidewalls of said channel.

10. The kennel run of isolating device claim 8 wherein said transverse supports are rods.

11. The kennel run isolating device of claim 8 wherein each said transverse support has a drop center portion, the said panel resting within said center portion.

12. The kennel run isolating device of claim 11 wherein each said transverse support has downturned ends outwardly of said center portion, said downturned ends hanging downward outside the sidewalls of said channel.

* * * * *